(12) United States Patent
Suzuki et al.

(10) Patent No.: US 8,248,753 B2
(45) Date of Patent: Aug. 21, 2012

(54) DIELECTRIC CERAMIC AND LAMINATED CERAMIC CAPACITOR

(75) Inventors: Shoichiro Suzuki, Yasu (JP); Toshikazu Takeda, Omihachiman (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 362 days.

(21) Appl. No.: 12/645,985

(22) Filed: Dec. 23, 2009

(65) Prior Publication Data

US 2010/0182733 A1   Jul. 22, 2010

(30) Foreign Application Priority Data

Jan. 16, 2009 (JP) .................. 2009-007190

(51) Int. Cl.
*H01G 4/20* (2006.01)
*H01G 4/06* (2006.01)
*C04B 35/00* (2006.01)

(52) U.S. Cl. ............... 361/321.2; 361/320; 361/321.3; 361/321.4; 361/321.5; 501/134; 501/136; 501/137

(58) Field of Classification Search .... 361/321.1–321.5, 361/320; 501/134, 136, 137
See application file for complete search history.

(56) References Cited

U.S. PATENT DOCUMENTS

| 6,556,422 B2 | 4/2003 | Kim et al. |
| 2002/0074154 A1 | 6/2002 | Kim et al. |

FOREIGN PATENT DOCUMENTS

| CN | 1332131 A | 1/2002 |
| JP | 3-059907 A | 3/1991 |
| JP | 4-026545 A | 1/1992 |
| JP | 4-042855 A | 2/1992 |
| JP | 7045122 A | 2/1995 |
| JP | 2002029838 A | 1/2002 |
| JP | 2003-146660 A | 5/2003 |
| JP | 2004-353072 A | 12/2004 |
| JP | 2005075377 A | 3/2005 |
| JP | 2008-174413 A | 7/2008 |

OTHER PUBLICATIONS

Chinese Office Action issued for counterpart application CN 201010003688.0, Office action dated May 30, 2012.

*Primary Examiner* — Eric Thomas
*Assistant Examiner* — Arun Ramaswamy
(74) *Attorney, Agent, or Firm* — Dickstein Shapiro LLP

(57) ABSTRACT

A dielectric ceramic for use in dielectric ceramic layers has a main component represented by a composition formula of $(Sr_{1-x-y}Sn_xBa_y)TiO_3$, wherein x is $0.005 \leq x \leq 0.24$, y is $0 \leq y \leq 0.25$ in the composition formula. Preferably, the dielectric ceramic includes 0.01 mol to 5 mol of M (M is at least one of Mn and V) calculated as MO and/or 0.2 mol to 5 mol of Si calculated as $SiO_2$, with respect to 100 mols of the main component, and more preferably, further includes 0.1 mol to 25 mol of Ca calculated as CaO with respect to 100 mols of the main component. The dielectric ceramic has an increased dielectric constant permitting size reduction when used in a laminated ceramic capacitor.

20 Claims, 1 Drawing Sheet

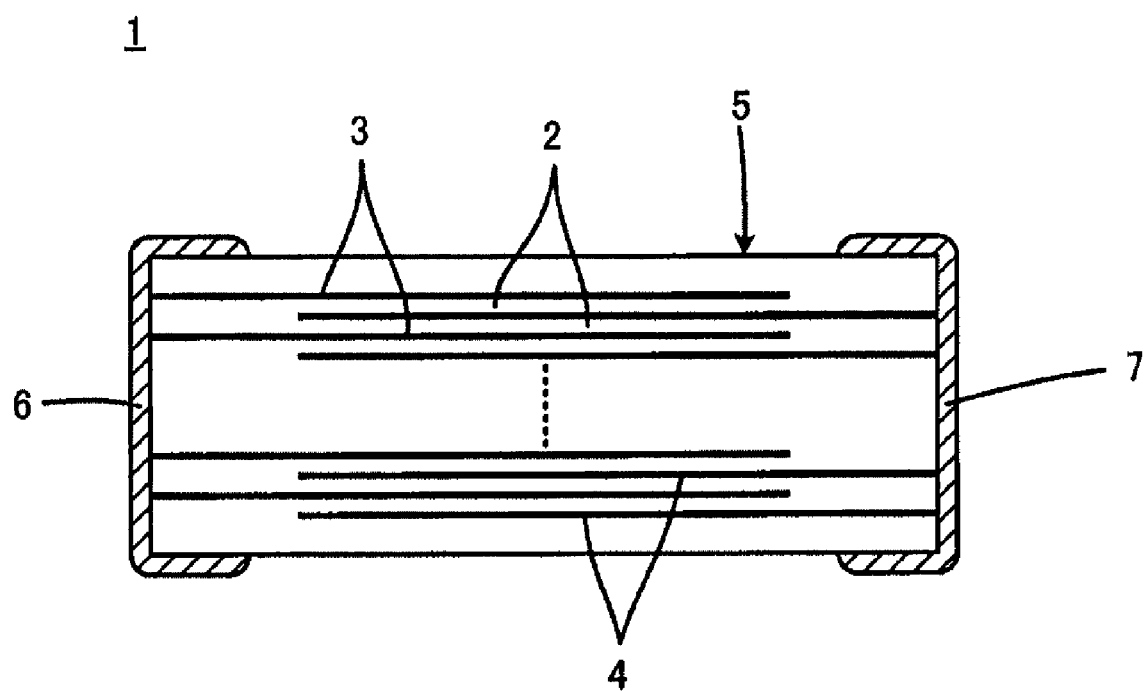

DIELECTRIC CERAMIC AND LAMINATED CERAMIC CAPACITOR

BACKGROUND OF THE INVENTION

1. Field of the Invention

The present invention relates to a strontium titanate (SrTiO$_3$) dielectric ceramic, and a laminated ceramic capacitor configured with the use of the dielectric ceramic.

2. Description of the Related Art

SrTiO$_3$ dielectric ceramics are preferably used in capacitors for temperature compensation since the capacitances of capacitors configured with the use of these dielectric ceramics have good linearity for their temperature coefficients. Furthermore, SrTiO$_3$ dielectric ceramics are also used in high-voltage capacitors.

However, SrTiO$_3$ dielectric ceramics generally have low dielectric constants, and thus have the defect of difficulty in reduction of the size of capacitors configured with the use of such dielectric ceramics.

In order to eliminate the defect mentioned above, a dielectric ceramic as described in, for example, Japanese Patent Laid-Open No. 7-45122 (Patent Document 1) has been proposed. The dielectric ceramic described in Patent Document 1 contains SrTiO$_3$ as its main component, and further includes PbTiO$_3$, Bi$_2$O$_3$, etc. PbTiO$_3$ and Bi$_2$O$_3$ act to increase the dielectric constant of the dielectric ceramic.

However, PbTiO$_3$ and Bi$_2$O$_3$ decrease the resistance to reduction of dielectric ceramic material. Therefore, PbTiO$_3$ and Bi$_2$O$_3$ are not always suitable for constituting dielectric ceramic layers in laminated ceramic capacitors which have internal electrodes containing a base metal as their main components. From this aspect, it is not easy to increase the dielectric constants of SrTiO$_3$ dielectric ceramics.

Furthermore, Patent Document 1 discloses the addition of various additives to SrTiO$_3$ dielectric ceramics, including SnO$_2$, for improving the withstand voltage. However, Patent Document 1 describes that the increase in the added amount of SnO$_2$ decreases the dielectric constant. Also from this point of view, increasing the dielectric constant of the SrTiO$_3$ dielectric ceramics is not simple.

SUMMARY OF THE INVENTION

Therefore, an object of the invention is to provide a SrTiO$_3$ dielectric ceramic, and a laminated ceramic capacitor configured with the use of this dielectric ceramic, which can solve the problems described above.

A dielectric ceramic of this invention has a feature in that a main component is represented by a composition formula: (Sr$_{1-x-y}$Sn$_x$Ba$_y$)TiO$_3$, wherein x is $0.005 \leq x \leq 0.24$ and y is $0 \leq y \leq 0.25$.

Further, the dielectric ceramic of this invention includes preferably 0.01 mol to 5 mol of M (M is at least one of Mn and V) in terms of MO with respect to 100 mol of the main component.

The dielectric ceramic of this invention may also include 0.2 mol to 5 mol of Si in terms of SiO$_2$ with respect to 100 mol of the main component.

It is to be noted that the M and Si mentioned above may be each independently included, or both the M and Si may be included, or neither may be present.

The dielectric ceramic of this invention includes more preferably 0.1 mol to 25 mol of Ca in terms of CaO with respect to 100 mol of the main component.

In addition, this invention is directed to a laminated ceramic capacitor including a capacitor main body composed of a plurality of laminated dielectric ceramic layers, and a plurality of internal electrodes formed along a specific interface between the dielectric ceramic layers; and a plurality of external electrodes formed in positions different from each other on the outer surface of the capacitor main body, and electrically connected to specific one of the internal electrodes. The laminated ceramic capacitor according to the invention has a feature in that a dielectric ceramic layer is composed of the dielectric ceramic according to the invention as described above.

The dielectric ceramic according to the invention can exhibit an increased dielectric constant although the dielectric ceramic contains SrTiO$_3$ as its main component. It is estimated that this is because Sn is located as a bivalent cation at the A site in a perovskite structure compound represented by ABO$_3$. As described in Patent Document 1 mentioned above, when normal calcination of SnO$_2$ is simply added is carried out in the atmosphere, Sn will be located as a quadrivalent element at the B site. In this case, Sn is not able to produce the effect of improvement in the dielectric constant of the ceramic.

In the dielectric ceramic according to the invention, preferably, a predetermined mount of Ba is further substituted for Sr at the A site of the SrTiO$_3$ main component. Such substitution of Ba can further improve the dielectric constant.

In the dielectric ceramic according to the invention, the addition of a predetermined amount of M (M is at least one of Mn and V) or the addition of a predetermined amount of Si allows the calcination temperature to be decreased.

In the dielectric ceramic according to the invention, the addition of a predetermined amount of Ca can improve the temperature characteristics of the capacitance.

Thus, when the dielectric ceramic according to the invention is used to configure a laminated ceramic capacitor, the improvement in the dielectric constant of the dielectric ceramic layer allows the laminated ceramic capacitor to be reduced in size. Further, use of the dielectric ceramic to configure a laminated ceramic capacitor allows the dielectric ceramic layers and internal electrodes containing a base metal as its main component to be calcined simultaneously. Therefore, the cost of the laminated ceramic capacitor can be reduced, and the range of options can be expanded for the internal electrode material.

BRIEF DESCRIPTION OF THE DRAWINGS

FIG. 1 is a cross-sectional view schematically illustrating a laminated ceramic capacitor 1 according to an embodiment of the invention.

DETAILED DESCRIPTION OF THE INVENTION

First, a laminated ceramic capacitor 1 to which a dielectric ceramic according to the invention is applied will be described with reference to FIG. 1.

The laminated ceramic capacitor 1 includes a capacitor main body 5 composed of a plurality of laminated dielectric ceramic layers 2 and a plurality of internal electrodes 3 and 4 along interfaces between the dielectric ceramic layers 2. The internal electrodes 3 and 4 contain, for example, Ni, as its main component.

First and second external electrodes 6 and 7 are formed in positions different from each other on the outer surface of the capacitor main body 5. The external electrodes 6 and 7 may contain Ag or Cu as their main components. In the laminated ceramic capacitor 1 shown in FIG. 1, the first and second external electrodes 6 and 7 are formed on each of end faces of the capacitor main body 5 opposed to each other. The internal electrodes 3 and 4 include a plurality of first internal electrodes 3 electrically connected to the first external electrode 6 and a plurality of second internal electrodes 4 electrically connected to the second external electrode 7, and these first and second internal electrodes 3 and 4 are interlaminated in the laminate direction.

In this laminated ceramic capacitor 1, the dielectric ceramic layer 2 is composed of a dielectric ceramic having a main component represented by the composition formula: $(Sr_{1-x-y}Sn_xBa_y)TiO_3$.

In the composition formula, x is $0.005 \leq x \leq 0.24$. If x is less than 0.005, it is not possible to obtain the effect of increase in dielectric constant. On the other hand, if x is greater than 0.24, a hetero-phase is deposited, and also in this case, it is not possible to obtain the effect of increase in dielectric constant.

Furthermore, in the above-mentioned composition formula, y is $0 \leq y \leq 0.25$. That is, the composition in which Ba is not substituted for Sr (y=0) is also possible. However, when Ba is substituted within the predetermined range mentioned above, the dielectric constant is further improved. It is to be noted that when y is greater than 0.25, the dielectric loss, tan $\delta$, is increased, which is not preferable.

In the dielectric ceramic described above, it is important for Sn to be located as a bivalent cation at the A site of $ABO_3$. This will causes Sn to produce the effect of improvement in dielectric constant. When Sn is instead located as a quadrivalent element at the B site, Sn is not expected to produce the effect of improvement in dielectric constant.

In order to obtain the valence of Sn, reference may be made to a method in which XANES measurement is carried out by a transmission method at the Sn—K absorption edge to evaluate the valance from the chemical shift of the absorption edge. In general, the larger valence shifts the absorption edge to the higher energy side, and this shift can be compared with each of references SnO (bivalent) and $SnO_2$ (quadrivalent) to identify the valence. In the case of perovskite, an unambiguous determination is made in such a way that the bivalent Sn is located at the A site or quadrivalent Sn is located at the B site.

Other methods which are able to identify the valence, such as, for example, TEM-EELS and ESR, may also be used.

In order to obtain a dielectric ceramic in which Sn is located as a bivalent cation at the A site, it is preferable to apply a reducing atmosphere for calcination. More preferably, when a Sr compound and a Ti compound are to be calcined to produce a perovskite $SrTiO_3$, a Sn compound is mixed with the Sr compound and the Ti compound in advance, and the atmosphere for calcination is bought into a reducing atmosphere.

It is to be noted that when the main component of the dielectric ceramic is represented by a composition formula: $(Sr_{1-x-y}Sn_xBa_y)_mTiO_3$, the value of m is normally around 1. In order to obtain satisfactory characteristics for the insulation resistance, it is preferable to select m within the range of $0.99 \leq m \leq 1.15$.

It is preferable that the dielectric ceramic constituting the dielectric ceramic layers 2 further include 0.01 mol to 5 mol of M (M is at least one of Mn and V) in terms of MO with respect to 100 mol of the main component described above. Furthermore, it is preferable that the dielectric ceramic include 0.2 mol to 5 mol of Si in terms of $SiO_2$ with respect to 100 mol of the main component, in addition to the M or instead of the M. This addition of M and/or Si can lower the calcination temperature for sintering the dielectric ceramic, without decreasing the resistance to reduction. Therefore, even when the internal electrodes 3 and 4 contain a base metal such as Ni as its main component, the dielectric ceramic layers 2 and the internal electrodes 3 and 4 can be calcined simultaneously without problems.

Further, when M is less than 0.01 mol in terms of MO with respect to 100 mol of the main component, the effect of low-temperature calcination will not be sufficiently produced. On the other hand, when M is greater than 5 mol, the insulation resistance will be decreased. Furthermore, when Si is less than 0.2 mol in terms of $SiO_2$ with respect to 100 mol of the main component, the sufficient of reduction in calcination temperature will not be sufficiently achieved. On the other hand, when Si is greater than 5 mol, a hetero-phase will be produced to decrease the insulation resistance.

Moreover, it is preferable that the dielectric ceramic described above include 0.1 mol to 25 mol of Ca in terms of CaO with respect to 100 mol of the main component. This can improve the temperature characteristics of the dielectric ceramic. For this addition of Ca, an oxide of Ca may be used, or a carbonate of Ca may be used.

It is to be noted that when Ca is less than 0.1 mol in terms of CaO with respect to 100 mol of the main component, the effect of improvement in temperature characteristics will not be sufficiently achieved. On the other hand, when Ca is greater than 25 mol, the resistance to reduction will be decreased to decrease the insulation resistance.

Experimental examples carried out based on the invention will be described below.

EXPERIMENTAL EXAMPLE 1

First, respective powders of $TiO_2$, $SrCO_3$, and $SnO_2$ were prepared as starting materials. These powders were blended to have a composition indicating each value of x and m in the composition formula: $(Sr_{1-x}Sn_x)_mTiO_3$ shown in Table 1. Next, this blended powder was mixed and ground in a ball mill, and dried then to obtain a mixed powder.

Next, the mixed powder was thermally treated at a temperature of 1050° C. for 2 hours in an atmosphere composed of a $N_2$—$H_2$ mixed gas with an oxygen partial pressure of $10^{-10}$ MPa to obtain a powder containing $(Sr_{1-x}Sn_x)_mTiO_3$ as its main component. This powder was subjected to dry grinding to give a ceramic raw material powder.

A polyvinyl butyral binder and an organic solvent containing ethanol were added to this raw material powder and mixed in a ball mill, thereby preparing a ceramic slurry.

Next, this ceramic slurry was subjected to sheet forming by the doctor blade method to obtain a ceramic green sheet with a thickness of 12 μm. A conductive paste containing Ni as its main component was printed on this ceramic green sheet to form a conductive paste film for constituting internal electrodes.

Next, a plurality of ceramics green sheets were laminated so that the opposed sides from which the conductive paste films were drawn were alternated, thereby obtaining a raw laminated body to serve as a capacitor main body.

The laminated body was then heated at a temperature of 350° C. in a $N_2$ atmosphere to burn off the binder, and then calcined at the calcination temperature shown in Table 1 for 2 hours in a reducing atmosphere composed of a $H_2$—$N_2$—$H_2O$ gas with an oxygen partial pressure of $10^{-10}$ to $10^{-12}$ MPa to obtain a sintered capacitor main body.

Next, a silver paste containing $B_2O_3$—$SiO_2$—BaO glass frit was applied to the opposed edge surfaces of the calcined laminated body, and baked at a temperature of 600° C. in a $N_2$ atmosphere to form external electrodes electrically connected to the internal electrodes, thereby obtaining laminated ceramic capacitor samples.

The laminated ceramic capacitor thus obtained had outer dimensions of a width 1.0 mm, a length 2.0 mm, and a thickness 0.5 mm, and the thickness of the dielectric ceramic layers interposed between the internal electrodes was 10 μm. Further, the number of effective dielectric ceramic layers was 5, and the area of the internal electrode opposed per ceramic layer was $1.3 \times 10^{-6}$ m$^2$.

Next, the laminated ceramic capacitor obtained was evaluated in terms of electrical characteristics as follows.

The capacitance and dielectric loss (tan δ) were measured under the condition of 0.2 kVrms/mm within a range of −55 to 125° C. by using an automatic bridge-type measuring apparatus. The dielectric constant was obtained from the obtained capacitance.

With the use of an insulation resistance meter, a direct-current voltage of 30 kV/mm was applied at a temperature of 25° C. for one minute to obtain the insulation resistance, and the specific resistance (log ρ) was calculated from the insulation resistance.

The dielectric constant, tan δ, and log ρ obtained as described above are shown in Table 1 below.

TABLE 1

| Sample Number | x | m | Calcination Temperature | Dielectric Constant | Tan δ (%) | Log ρ (Ω·m) |
|---|---|---|---|---|---|---|
| 1 | 0.000 | 1.00 | 1300 | 250 | 0.10 | 9.0 |
| 2 | 0.004 | 1.00 | 1300 | 320 | 0.30 | 9.0 |
| 3 | 0.005 | 1.00 | 1300 | 350 | 0.30 | 8.8 |
| 4 | 0.010 | 1.00 | 1300 | 380 | 0.40 | 8.5 |
| 5 | 0.050 | 1.00 | 1300 | 400 | 0.50 | 8.5 |
| 6 | 0.100 | 1.00 | 1300 | 450 | 0.80 | 8.3 |
| 7 | 0.150 | 1.00 | 1300 | 400 | 1.00 | 8.0 |
| 8 | 0.200 | 1.00 | 1300 | 400 | 1.20 | 8.0 |
| 9 | 0.250 | 1.00 | 1300 | 320 | 1.50 | 7.5 |

TABLE 1-continued

| Sample Number | x | m | Calcination Temperature | Dielectric Constant | Tan δ (%) | Log ρ (Ω·m) |
|---|---|---|---|---|---|---|
| 10 | 0.300 | 1.00 | 1300 | 300 | 2.20 | 7.2 |
| 11 | 0.100 | 0.99 | 1300 | 450 | 1.00 | 7.5 |
| 12 | 0.100 | 1.10 | 1300 | 400 | 1.10 | 8.9 |
| 13 | 0.100 | 1.15 | 1300 | 350 | 1.10 | 9.0 |

As seen from Table 1, samples 3 to 8 and 11 to 13 in which the Sn substitution x meets the condition $0.005 \leq x \leq 0.24$ had their the dielectric constant improved by 100 or more compared with the sample 1 with a Sn substitution x of "0".

In order to evaluate the valence of Sn contained in the dielectric ceramic layer provided in the laminated ceramic capacitor for the samples 3 to 8 and 11 to 13 in which the Sn substitution x meets the condition $0.005 \leq x \leq 0.24$, an evaluation of the valence by XANES measurement was carried out by a transmission method at the Sn—K absorption edge to evaluate the valence from the chemical shift of the absorption edge. The evaluation showed that the valence of Sn was bivalent, which indicates that Sn is located as a bivalent cation at the A site in ABO$_3$.

In contrast to these samples, sample 2 with a Sn substitution x less than 0.005 had an increase in dielectric constant of less than 100, namely, 70, with respect to the sample 1 with the Sn substitution x of "0".

In samples 9 and 10 with a Sn substitution x greater than 0.24, a hetero-phase deposited, and the increase in dielectric constant was less than 100 with respect to the sample 1 with the Sn substitution x of "0"

EXPERIMENTAL EXAMPLE 2

The dielectric ceramic main component employed was the composition of the sample 6 with x=0.100 and m=1.00 in the composition formula: $(Sr_{1-x}Sn_x)_m TiO_3$, manufactured in Experimental Example 1, to which a mol of MO (M is Mn or V) and b mol of SiO$_2$ was added as shown in Table 2 with respect to 100 mol of the main component, and an evaluation was carried out in the same way as in Experimental Example 1. The results are shown in Table 2.

TABLE 2

| Sample Number | x | m | M species | a | b | Calcination Temperature | Dielectric Constant | Tan δ (%) | Log ρ (Ω·m) |
|---|---|---|---|---|---|---|---|---|---|
| 101 | 0.100 | 1.00 | Mn | 0.000 | 0.0 | 1300 | 450 | 0.80 | 8.3 |
| 102 | 0.100 | 1.00 | Mn | 0.005 | 0.0 | 1300 | 450 | 0.80 | 8.3 |
| 103 | 0.100 | 1.00 | Mn | 0.010 | 0.0 | 1250 | 430 | 0.80 | 9.0 |
| 104 | 0.100 | 1.00 | Mn | 0.250 | 0.0 | 1250 | 430 | 0.80 | 10.5 |
| 105 | 0.100 | 1.00 | Mn | 0.500 | 0.0 | 1250 | 420 | 0.80 | 11.0 |
| 106 | 0.100 | 1.00 | Mn | 1.000 | 0.0 | 1225 | 420 | 0.80 | 11.0 |
| 107 | 0.100 | 1.00 | Mn | 2.500 | 0.0 | 1200 | 400 | 0.80 | 9.8 |
| 108 | 0.100 | 1.00 | Mn | 5.000 | 0.0 | 1200 | 380 | 0.80 | 6.5 |
| 110 | 0.100 | 1.00 | Mn | 0.000 | 0.1 | 1300 | 450 | 0.80 | 8.3 |
| 111 | 0.100 | 1.00 | Mn | 0.000 | 0.2 | 1200 | 460 | 0.80 | 8.3 |
| 112 | 0.100 | 1.00 | Mn | 0.000 | 2.0 | 1200 | 460 | 0.80 | 8.4 |
| 113 | 0.100 | 1.00 | Mn | 0.000 | 5.0 | 1150 | 400 | 0.80 | 7.7 |
| 115 | 0.100 | 1.00 | V | 0.020 | 3.0 | 1200 | 450 | 0.80 | 10.3 |
| 116 | 0.100 | 1.00 | V | 0.300 | 2.0 | 1200 | 460 | 0.80 | 11.0 |
| 117 | 0.100 | 1.00 | V | 0.500 | 2.0 | 1200 | 460 | 0.80 | 11.2 |
| 118 | 0.100 | 1.00 | V | 0.800 | 1.0 | 1200 | 460 | 0.80 | 11.2 |

As seen from Table 2, samples 103 to 108 and 115 to 118 with the added amount a of MO (M is Mn or V) from 0.01 mol to 5 mol with respect to 100 mol of the main component, and samples 111 to 118 with the added amount b of SiO$_2$ from 0.2 mol to 5 mol with respect to 100 mol of the main component, had calcination temperatures for sintering the dielectric ceramic which were lower compared with the sample 101 in which both the added amount a of MO and the added amount b of SiO$_2$ were "0".

In contrast to these samples, samples 102 and 110 with the added amount a of MO less than 0.01 mol and the added amount b of SiO$_2$ less than 0.2 mol with respect to 100 mol of the main component did not exhibit the effect of reducing the calcination temperature compared with the sample 101 where both the added amount a of MO and the added amount b of SiO$_2$ of "0".

It is to be noted that it has been confirmed that the added amount a of MO greater than 5 mol decreases the insulating resistance, and the added amount b of $SiO_2$ greater than 5 mol produces a hetero-phase and decreases the insulating resistance.

EXPERIMENTAL EXAMPLE 3

For the dielectric ceramic main component, the composition of the sample 6 with x=0.100 and m=1.00 in the composition formula: $(Sr_{1-x}Sn_x)_mTiO_3$, manufactured in Experimental Example 1, was used together with 0.500 mol of MnO, 2.0 mol of $SiO_2$, and further c mol of CaO with respect to 100 mol of this main component as shown in Table 3, ΔC (−55) and ΔC (125) were evaluated as shown in Table 3.

ΔC (−55) refers to a rate of change (%) in capacitance at −55° C. with the capacitance at 25° C. as a reference, whereas ΔC (125) refers to a rate of change (%) in capacitance at 125° C. with the capacitance at 25° C. as a reference.

TABLE 3

| Sample Number | x | m | M species | a | b | c | Calcination Temperature | ΔC (−55) (%) | ΔC (125) (%) |
|---|---|---|---|---|---|---|---|---|---|
| 201 | 0.100 | 1.00 | Mn | 0.500 | 2.0 | 0 | 1200 | 70 | −35 |
| 202 | 0.100 | 1.00 | Mn | 0.500 | 2.0 | 0.1 | 1200 | 65 | −30 |
| 203 | 0.100 | 1.00 | Mn | 0.500 | 2.0 | 10 | 1200 | 30 | −28 |
| 204 | 0.100 | 1.00 | Mn | 0.500 | 2.0 | 15 | 1200 | 23 | −26 |
| 205 | 0.100 | 1.00 | Mn | 0.500 | 2.0 | 25 | 1200 | 12 | −18 |

Table 3 shows that for samples 202 to 205 with the added amount c of CaO from 0.1 mol to 25 mol with respect to 100 mol of the main component, the rate of change in capacitance was reduced to improve the temperature characteristics of the dielectric ceramic, compared with sample 201 with an added amount c of CaO of "0".

It is to be noted that it has been confirmed that when Ca is less than 0.1 mol in terms of CaO with respect to 100 mol of the main component, the effect of improvement in temperature characteristics is not sufficiently achieved, while when Cs is greater than 25 mol, the resistance to reduction is decreased to decrease the insulation resistance

EXPERIMENTAL EXAMPLE 4

First, in addition to respective powders of $TiO_2$, $SrCO_3$, and $SnO_2$, a $BaCO_3$ powder was prepared as starting materials. The powders were blended to have a composition with the values of x, y and m shown in Table 4, in the composition formula: $(Sr_{1-x-y}Sn_xBa_y)TiO_3$. Next, this blended powder was mixed and ground in a ball mill, and then dried then to obtain a mixed powder.

Next, the mixed powder was thermally treated at a temperature of 1050° C. for 2 hours in an atmosphere composed of a $N_2$—$H_2$ mixed gas with an oxygen partial pressure of $10^{-10}$ MPa to obtain a powder containing $(Sr_{1-x-y}Sn_xBa_y)TiO_3$ as its main component. The powder was subjected to dry grinding to give a ceramic raw material powder.

Then, the operations were carried out in the same way as in Experimental Example 1 to manufacture laminated ceramic capacitors samples, and evaluations were carried out in the same way as in Experimental Example 1. The results are shown in Table 4.

TABLE 4

| Sample Number | x | y | m | Calcination Temperature | Dielectric Constant | Tan δ (%) | Log ρ (Ω·m) |
|---|---|---|---|---|---|---|---|
| 301 | 0.05 | 0.00 | 1.00 | 1300 | 400 | 0.50 | 8.50 |
| 302 | 0.05 | 0.01 | 1.00 | 1300 | 404 | 0.51 | 8.51 |
| 303 | 0.05 | 0.05 | 1.00 | 1300 | 421 | 0.56 | 8.56 |
| 304 | 0.05 | 0.10 | 1.00 | 1300 | 442 | 0.63 | 8.63 |
| 305 | 0.05 | 0.15 | 1.00 | 1300 | 463 | 0.69 | 8.69 |
| 306 | 0.05 | 0.20 | 1.00 | 1300 | 483 | 0.75 | 8.75 |
| 307 | 0.05 | 0.25 | 1.00 | 1300 | 500 | 0.81 | 8.80 |
| 308 | 0.05 | 0.20 | 0.99 | 1300 | 510 | 0.98 | 8.38 |
| 309 | 0.05 | 0.20 | 1.10 | 1300 | 450 | 0.66 | 8.75 |
| 310 | 0.05 | 0.20 | 1.15 | 1300 | 425 | 0.52 | 8.83 |

Table 4 shows that samples 302 to 310 with Ba present achieved higher dielectric constants compared with the sample 301 with the Ba substitution amount y was "0".

It is to be noted that it has been confirmed that when the Ba substitution y is greater than 0.25, the dielectric loss, tan δ, is increased more then necessary.

What is claimed is:

1. A dielectric ceramic having a main component represented by a composition formula: $(Sr_{1-x-y}Sn_xBa_y)_mTiO_3$, wherein $0.005 \leq x \leq 0.24$, $0 \leq y \leq 0.25$ and m is about 1.

2. The dielectric ceramic according to claim 1, further comprising 0.01 mol to 5 mol of M, where M is at least one member of the group consisting of Mn and V) in terms of MO with respect to 100 mol of the main component.

3. The dielectric ceramic according to claim 2, further comprising 0.2 mol to 5 mol of Si in terms of $SiO_2$ with respect to 100 mol of the main component.

4. The dielectric ceramic according to claim 3, further comprising 0.1 mol to 25 mol of Ca in terms of CaO with respect to 100 mol of the main component.

5. The dielectric ceramic according to claim 4, wherein $0.01 \leq x \leq 0.2$, y is greater than 0, and $0.99 \leq m \leq 1.15$.

6. The dielectric ceramic according to claim 1, further comprising 0.2 mol to 5 mol of Si in terms of $SiO_2$ with respect to 100 mol of the main component.

7. The dielectric ceramic according to claim 6, further comprising 0.1 mol to 25 mol of Ca in terms of CaO with respect to 100 mol of the main component.

8. The dielectric ceramic according to claim 7, wherein $0.01 \leq x \leq 0.2$, y is greater than 0, and $0.99 \leq m \leq 1.15$.

9. The dielectric ceramic according to claim 1, further comprising 0.1 mol to 25 mol of Ca in terms of CaO with respect to 100 mol of the main component.

10. The dielectric ceramic according to claim 4, wherein $0.01 \leq x \leq 0.2$, y is greater than 0, and $0.99 \leq m \leq 1.15$.

11. The dielectric ceramic according to claim 1, wherein $0.01 \leq x \leq 0.2$, y is greater than 0, and $0.99 \leq m \leq 1.15$.

12. A laminated ceramic capacitor comprising:
a capacitor main body comprising a plurality of laminated dielectric ceramic layers, and a plurality of internal electrodes each of which is disposed at different interfaces between adjacent dielectric ceramic layers; and
a pair of external electrodes disposed at positions different from each other on the outer surface of the capacitor main body, wherein each external electrode is electrically connected to a different one of the internal electrodes, and
wherein the dielectric ceramic layers comprise the dielectric ceramic according to claim 11.

13. A laminated ceramic capacitor comprising:
a capacitor main body comprising a plurality of laminated dielectric ceramic layers, and a plurality of internal electrodes each of which is disposed at different interfaces between adjacent dielectric ceramic layers; and
a pair of external electrodes disposed at positions different from each other on the outer surface of the capacitor main body, wherein each external electrode is electrically connected to a different one of the internal electrodes, and
wherein the dielectric ceramic layers comprise the dielectric ceramic according to claim 9.

14. A laminated ceramic capacitor comprising:
a capacitor main body comprising a plurality of laminated dielectric ceramic layers, and a plurality of internal electrodes each of which is disposed at different interfaces between adjacent dielectric ceramic layers; and
a pair of external electrodes disposed at positions different from each other on the outer surface of the capacitor main body, wherein each external electrode is electrically connected to a different one of the internal electrodes, and
wherein the dielectric ceramic layers comprise the dielectric ceramic according to claim 8.

15. A laminated ceramic capacitor comprising:
a capacitor main body comprising a plurality of laminated dielectric ceramic layers, and a plurality of internal electrodes each of which is disposed at different interfaces between adjacent dielectric ceramic layers; and
a pair of external electrodes disposed at positions different from each other on the outer surface of the capacitor main body, wherein each external electrode is electrically connected to a different one of the internal electrodes, and
wherein the dielectric ceramic layers comprise the dielectric ceramic according to claim 6.

16. A laminated ceramic capacitor comprising:
a capacitor main body comprising a plurality of laminated dielectric ceramic layers, and a plurality of internal electrodes each of which is disposed at different interfaces between adjacent dielectric ceramic layers; and
a pair of external electrodes disposed at positions different from each other on the outer surface of the capacitor main body, wherein each external electrode is electrically connected to a different one of the internal electrodes, and
wherein the dielectric ceramic layers comprise the dielectric ceramic according to claim 5.

17. A laminated ceramic capacitor comprising:
a capacitor main body comprising a plurality of laminated dielectric ceramic layers, and a plurality of internal electrodes each of which is disposed at different interfaces between adjacent dielectric ceramic layers; and
a pair of external electrodes disposed at positions different from each other on the outer surface of the capacitor main body, wherein each external electrode is electrically connected to a different one of the internal electrodes, and
wherein the dielectric ceramic layers comprise the dielectric ceramic according to claim 4.

18. A laminated ceramic capacitor comprising:
a capacitor main body comprising a plurality of laminated dielectric ceramic layers, and a plurality of internal electrodes each of which is disposed at different interfaces between adjacent dielectric ceramic layers; and
a pair of external electrodes disposed at positions different from each other on the outer surface of the capacitor main body, wherein each external electrode is electrically connected to a different one of the internal electrodes, and
wherein the dielectric ceramic layers comprise the dielectric ceramic according to claim 3.

19. A laminated ceramic capacitor comprising:
a capacitor main body comprising a plurality of laminated dielectric ceramic layers, and a plurality of internal electrodes each of which is disposed at different interfaces between adjacent dielectric ceramic layers; and
a pair of external electrodes disposed at positions different from each other on the outer surface of the capacitor main body, wherein each external electrode is electrically connected to a different one of the internal electrodes, and
wherein the dielectric ceramic layers comprise the dielectric ceramic according to claim 2.

20. A laminated ceramic capacitor comprising:
a capacitor main body comprising a plurality of laminated dielectric ceramic layers, and a plurality of internal electrodes each of which is disposed at different interfaces between adjacent dielectric ceramic layers; and
a pair of external electrodes disposed at positions different from each other on the outer surface of the capacitor main body, wherein each external electrode is electrically connected to a different one of the internal electrodes, and
wherein the dielectric ceramic layers comprise the dielectric ceramic according to claim 1.

* * * * *